United States Patent [19]
Johnson

[11] Patent Number: 5,090,801
[45] Date of Patent: Feb. 25, 1992

[54] LASER VELOCIMETER FOR NEAR-SURFACE MEASUREMENTS

[75] Inventor: Dennis A. Johnson, Los Altos, Calif.

[73] Assignee: The United States of America as represented by the Administrator of the National Aeronautics and Space Administration, Washington, D.C.

[21] Appl. No.: 596,105

[22] Filed: Oct. 11, 1990

[51] Int. Cl.[5] .................................................. B01P 3/36
[52] U.S. Cl. ....................................... 356/28.5; 356/28
[58] Field of Search .............................. 356/28.5, 28

[56] References Cited

U.S. PATENT DOCUMENTS

| | | | |
|---|---|---|---|
| 4,099,870 | 7/1978 | Luzzi | 356/28.5 |
| 4,142,796 | 3/1979 | Riva | 356/28.5 |
| 4,148,585 | 4/1979 | Bargeron et al. | |
| 4,575,238 | 3/1986 | Knuhtsen et al. | |
| 4,659,218 | 4/1987 | Lasa et al. | 356/28 |
| 4,807,990 | 2/1989 | Keefer | 356/28.5 |
| 4,838,687 | 6/1989 | Pfeifer | |

OTHER PUBLICATIONS

Vasudevan et al., Conf: Intl. Cong. Instr. Aerospace Simulation Facilities, 21 Jun. '71, Belgium.
Electronics, p. 24, 28 Dec. 1964.
T. Tanaka et al., Applied Optics, Jan. 1975, vol. 14, No. 1.

Primary Examiner—Stephen C. Buczinski
Attorney, Agent, or Firm—Darrell G. Brekke; John R. Manning

[57] ABSTRACT

A laser Doppler velocimeter for near-wall measurements which includes at least one beam-turning device. The beam-turning device receives laser light, reflects and redirects the light at various angles in order to obtain measurements for all three velocity components at grazing incident angles. The beam-turning device includes a mirror or prism at one end which reflects the received light in a particular direction. A collector lens receives the particle scattered light from which the relevant velocity components are determined. The beam-turning device can also be a miniature fiber optic head which outputs laser light and can be turned in any direction.

15 Claims, 2 Drawing Sheets

LASER VELOCIMETER FOR NEAR-SURFACE MEASUREMENTS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates to a laser velocimeter for near surface measurements, and more particularly, to a miniature dual-beam type laser velocimeter for measuring near-wall three-dimensional turbulence in a wind tunnel or similar flow environment.

2. Description of the Related Art

Computational fluid dynamics has reached a level where solutions of the Reynolds-averaged, Navier-Stokes equations for complex three-dimensional flows are practical. In many applications for which these equations are solved of primary interest is the effect of the fluid flow on a solid body, e.g., an aircraft or aircraft component. In these cases, the modeling of the turbulent Reynolds stresses in the near-wall region becomes a critical element in achieving accurate predictions of skin friction and heat transfer. For strong inviscid/viscous interactions, near-wall modeling is also important in predicting the mean pressure field. Up until now, the understanding of how these Reynolds stresses behave in the near-wall region under complex flow conditions and how they should be modeled has been poor. This lack of understanding is due in part to the paucity of accurate near-wall turbulence data. Especially lacking are near-wall data for flows that are highly three-dimensional and/or in some stage of separation.

For three-dimensional (3-D) boundary layer flows, $-u'v'$ and $-w'v'$ are the most relevant Reynolds stresses. Most three-dimensional boundary layer studies have relied on hot wire anemometry to measure these quantities. The technique requires a fine wire, for example, 5 $\mu m$ in diameter, mounted on two prongs and inserted into a flow. A current is passed through the wire. The faster the air flow, the more the wire cools. By measuring the cooling effect of the wire with respect to time, the velocity of the flow can be determined. The major shortcomings of hot-wire anemometry are its relatively poor spatial resolution near surfaces when the fluctuating velocity component normal to the surface $v'$ must be measured and its inability to provide accurate measurements when turbulence levels are high. Because of its poor spatial resolution, measurements of $-u'v'$ and $-w'v'$ are generally limited to approximately 2 mm from a solid surface.

Laser velocimetry and, in particular, a dual-beam or fringe approach, offers the potential for expanding the near-wall turbulent flow database In the dual-beam approach, two mutually coherent laser beams are brought to a common focus in the flow. Local near-instantaneous fluid velocities are then determined by measuring the Doppler shift difference of laser light scattered by micron-size particles passing through the overlap region of the focused laser beams. Multiple velocity component, dual-beam laser velocimeters typically are multi-color systems. A two-velocity component system, for example, would consist of two pair of laser beams at two different wavelengths. Although dual-beam laser velocimetry is a very powerful technique, solid surfaces and the measurement of the crossflow velocity component w present problems. In addition, unlike hot-wire anemometry, as the test facility becomes larger, near surface measurements become more difficult with laser Doppler velocimetry since the measurement point becomes further removed from the optical components.

Solid surfaces present a problem for laser velocimetry because they can produce a large amount of diffusely reflected laser light. The diffusively reflected laser light that reaches the photodetector introduces noise into the signal which can cause measurement errors. Added noise can become so large that it overwhelms the low level signal bursts produced by the micron-size particles immersed in the flow. In which case, meaningful measurements become virtually impossible.

For boundary layer measurements, it is advantageous that the incident laser beams approach the wall of the object with a grazing incidence. Under these conditions, better spatial resolution normal to the wall is achieved and the amount of diffusively reflected light at the photodetector is reduced. However, the accurate measurement of the crossflow velocity component w is difficult with the laser beams at such a grazing incidence.

The velocity component sensed with a dual-beam laser velocimeter lies in the plane of the two incident beams and perpendicular to the bisector of the angle formed by these two beams. This bisector will be referred to as the optical axis. Congruent with the optical axis is the major axis of the ellipsoidal sensing volume located where the two laser beams intersect.

The u and v velocity components can be measured directly using overlapping sensing volumes having axes which lie parallel to the boundary-layer surface and perpendicular to the freestream flow direction. However, to measure the w component directly with the sensing volume axis parallel to the boundary-layer surface, the optical axis must be aligned with the freestream flow. Limitations in optical access usually preclude such an arrangement. Instead, the optical axis or sensing volume is inclined at an angle $\theta$ relative to the freestream flow. The resultant measured velocity component is equal to $u\cos\theta + w\sin\theta$. The larger $\theta$, the greater the sensitivity to the w component. In many facilities, however, limited optical access precludes making $\theta$ very large. In addition, when $\theta$ is large, the overlap region between the sensing volume for w and the sensing volumes for u and v becomes small, resulting in "virtual particle" measurement errors. Virtual particle measurement errors occur when signals from two different particles outside the overlap region are misinterpreted as coming from a single particle in the overlap region. These measurement errors can be quite large.

That is, a first problem is that if the dual-beam or fringe velocimeter system relies on a grazing incidence of the laser beams where the laser beams enter the flow from the side, sufficient sensitivity to the w component can be difficult to achieve. Direct measurements of the u and v components can be easily made but only partial sensitivity to the w component is possible because the velocity component sensed using dual-beam laser velocimetry is perpendicular to the optical axis. Usually, only small sensitivities to the w component are possible because of limited optical access. The smaller the sensitivity the greater the uncertainty in the w component measurement.

A second problem in the velocimeter system arises when the overlap region of individual sensing volumes of a multi-velocity component laser velocimeter is small in comparison to the individual sensing volumes. In this case, signals from particles outside the overlap region can cause "virtual particle" errors if the data reduction assumes coincident multi-channel measurements from the same particle. The virtual particle problem usually degrades the accuracy of the turbulent Reynolds stresses involving w.

Finally, there is the problem of deteriorating performance with an increase in scale. One way to obtain better resolution of the near-wall region is to generate a larger scale flow. In laser Doppler velocimetry, near-wall measurement capabilities degrade as the size of the test facility becomes larger because of practical limitations. One practical limitation is that the scale of the flow usually does not increase in direct proportion to the size of the facility. Another limitation is that as the optical components become larger they become poorer in quality. In addition, diffraction-limited performance and light collection at large solid angles become very expensive and difficult to achieve.

SUMMARY OF THE INVENTION

An object of the present invention is to provide a laser velocimeter for near surface measurements in which a direct measurement of the cross flow velocity w is obtained with laser beams at a grazing incidence angle.

A further object of the present invention is to improve placement of the transmitting and receiving lens so that they are close to the measurement region of interest regardless of the size of the test facility.

Another object of the present invention is to provide a laser velocimeter in which turbulence measurements are free of "virtual particle" errors.

Yet another object of the present invention is to provide a laser velocimeter with improved flexibility with regard to applications in different facilities.

The above-mentioned objects are attained by providing a probe in a flow that will turn laser beams 90° while negligibly influencing the flow to be measured. The probe could include a mirror or small prism mounted on an end of the probe to provide beam turning. The beam-turning probe could, for example, extend through the opposite wind tunnel wall or be mounted to a probe-drive mechanism mounted within the wind tunnel. The beam-turning probe could also enter the flow from the measurement surface and a fiber optic unit with a transmitting lens could be used to direct the laser beam from the laser table. Because the fiber optic head is only used for light sending and not receiving, the fiber optic head may be made small enough to be placed in the flow. In addition, a dual probe may be used for simultaneous measurements of the u, v and w velocity components.

These objects, together with other objects and advantages which will be subsequently apparent reside in the details of the construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1A:
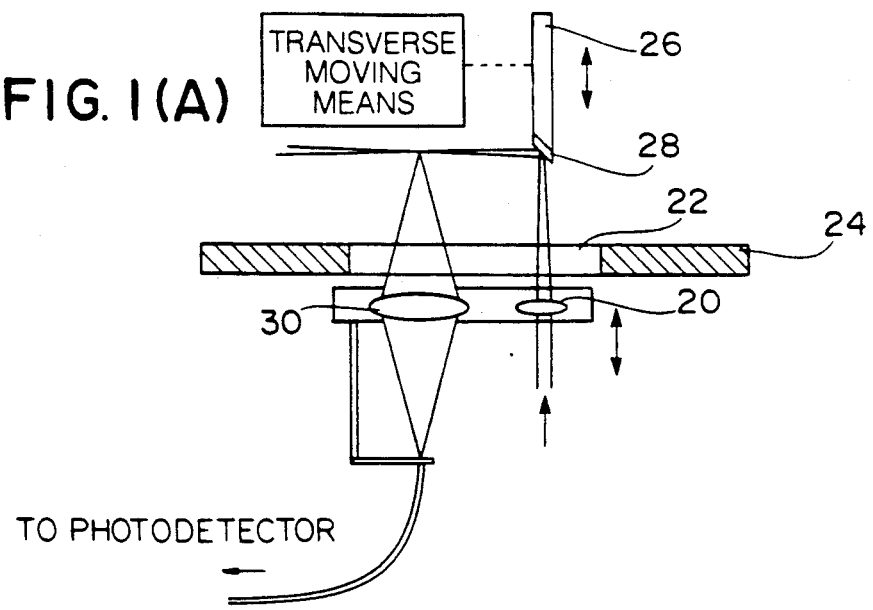
FIG. 1(A) is a schematic diagram of a miniature laser velocimeter for near-wall three-dimensional turbulence measurements including a beam-turning probe entering a flow from an opposite tunnel wall or attached to a probe-drive mechanism within a test section, according to a first embodiment of the present invention.

FIG. 1 is a schematic representation of a laser Doppler velocimeter for near-wall three-dimensional turbulence measurements according to a first embodiment of the present invention. In FIG. 1(A), laser beams from an optics table (not shown) are irradiated onto a first lens 20. The first lens 20 causes the laser beams to focus and cross subsequent to (1) passing through an optical port 22 in a wind tunnel wall 24, or an optical port in a model inside the wind tunnel, and (2) being turned nearly 90° by a beam-turning probe 26 with a mirror 28 mounted on its end. The beam-turning probe 26 can be, for example, straight or goose-necked in shape.

The beam-turning probe 26 can, for example, extend through the opposite wind tunnel wall or can be mounted to some form of probe-drive mechanism mounted within the wind tunnel. The beam-turning probe 26 with the mirror 28 on one end can be very small in diameter since it need only accommodate the closely spaced incident laser beams. Typical sizes of mirror probes are from, for example, 3 to 6 mm in diameter. This is optimal for small wind tunnel facilities. For flow disturbances not to be excessive, the location of the sensing volume (i.e., the laser beam cross-over point) must be at least 10 probe radii from the beam-turning probe.

The beam-turning probe 26 turns or rotates the incident laser beams approximately 90°. This allows the incident laser beams to be oriented for maximum sensitivity with respect to the shear stress of interest (i.e, either -u'v' or -w'v') yet remain at a grazing incidence relative to the measurement surface. A second lens (collector lens) 30 collects the particle-scattered light through the optical port 22 and sends it to a photodetector (not shown). The photodetector produces an electrical output from which a particular velocity component can be determined from the Doppler shift difference. The second lens 30 has a large solid angle to collect as much particle-scattered light as possible.

The turning of the laser beam using the beam-turning probe 26 allows the system to independently measure the velocity in all three directions, u, v and w. Therefore, all three velocity components can be measured at grazing incident angles to the surface of an object in a wind tunnel or similar environment. This also allows the optics of the velocimeter to be placed closer to the measurement region of interest so that near-wall measurements can be obtained more easily. In addition, the invention is adaptable to ongoing experiments in conventional wind tunnels using probe mechanisms. The standard probe need only be substituted with the beam-turning probe of the present invention.

Figure 1B:
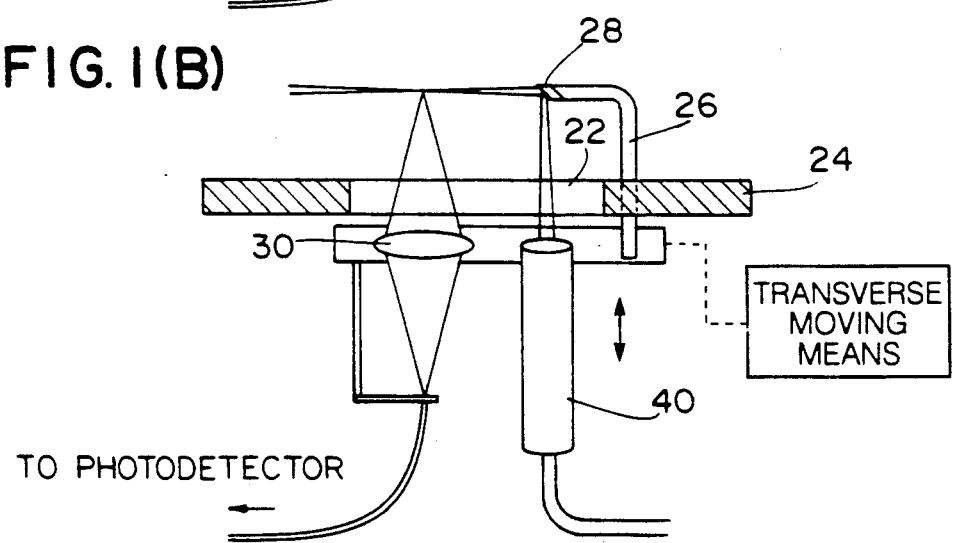
FIG. 1(B) is a schematic diagram of a miniature laser velocimeter for near-wall three-dimensional turbulence measurements including a beam turning-probe entering a flow from a test wall and a fiber-optic head outside a wind tunnel, according to a second embodiment of the present invention.

FIG. 1(B) is a schematic representation of a laser velocimeter system according to a second embodiment of the present invention. In FIG. 1(B), the beam-turning probe enters the flow from the measurement surface. A fiber optic head 40 is located outside the wind tunnel. Lens 20 is not shown since it is a part of the fiber optic head 40. The fiber optic head 40 directs laser beams from a laser through the optical port 22 and onto the mirror 28 attached to the beam-turning probe 26. The beam-turning probe 26, can be, for example, attached to the measurement wall and have a goose-neck portion which is parallel to the measurement wall. The gooseneck portion has the mirror 28 attached to a free end.

The fiber optic head 40 allows easy repositioning of the laser beams since it can easily be moved from one location to the next as a package, as opposed to redirecting the laser beams with a series of mirrors.

Figure 1C:
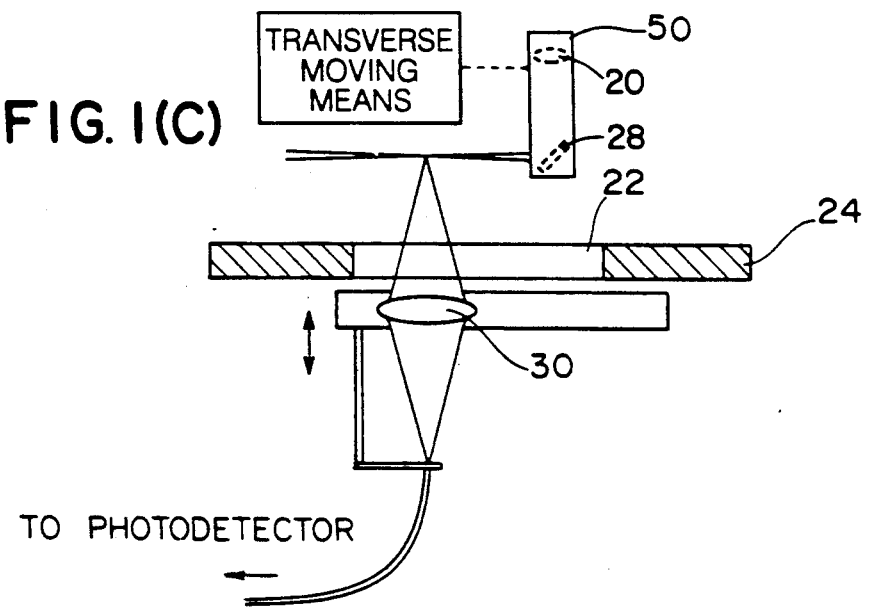
FIG. 1(C) is a schematic diagram of a miniature laser velocimeter for near-wall three-dimensional turbulence measurements including a fiber optic head located inside a wind tunnel, according to a third embodiment of the present invention.

FIG. 1(C) is a schematic representation of a laser velocimeter system according to a third embodiment of the present invention. In FIG. 1(C), a miniature fiber optic head 50 is placed inside, for example, the wind tunnel rather than outside, as shown in FIG. 1(B). The first lens 20 and the mirror 28 are incorporated inside the miniature fiber optic head 50. The miniature fiber optic head 50 can be turned in any desired direction as can the beam-turning probe 26 having the mirror 28 attached thereto shown in FIG. 1(A).

Commercially available fiber optic heads are too large (approximately 14 mm in diameter) to be placed in flows without causing significant flow disturbances. Since, however, the present invention requires that the fiber optic head need only be used for light sending and not light receiving, it is possible that a fiber optic head can be made small enough (approximately 6 mm in diameter) to be placed in the flow without causing significant disturbances.

In the above systems, the location of the beam-turning probe 26 or miniature fiber optic head 50 determines the distance of the sensing volume from the surface of the wind tunnel or model. Thus, the beam-turning probe must be precisely scanned. The positioning of the transmitting and collecting optics (first and second lenses 20 and 30) is less critical. The location of the first lens 20 only determines the fore and aft location of the sensing volume. The second lens 30 need only be positioned close enough to maintain a reasonable focus of the sensing volume image. The two or four (six for a dual probe system) incident laser beams (two for each velocity component) are converged from a fixed optical table (not shown) on which a laser, optics for color separation, frequency shifting optics, and detection optics (not shown) are located. An optical fiber is used to send the scattered light to the optics table. Fiber optics could also be used for the incident beams.

The three velocity component measurements made by the present invention require pointing the beam-turning probe 26 or fiber optic head 50 and laser beams in two different directions. In, for example, FIG. 1A, with a flow coming out of the paper, the Reynolds stresses $u'^2$, $v'^2$, and $-u'v'$ can be measured. Then, with the laser beams redirected so that the flow is left to right with respect to the paper, the Reynolds stresses $w'^2$, $v'^2$, and $-w'v'$ can be measured. A third direction is needed to measure the final Reynolds stress $-w'u'$. This final stress is often, however, the least important of the Reynolds stresses. For thin shear layers $-u'v'$ and $-w'v'$ are the most important Reynolds stresses.

Figure 2:
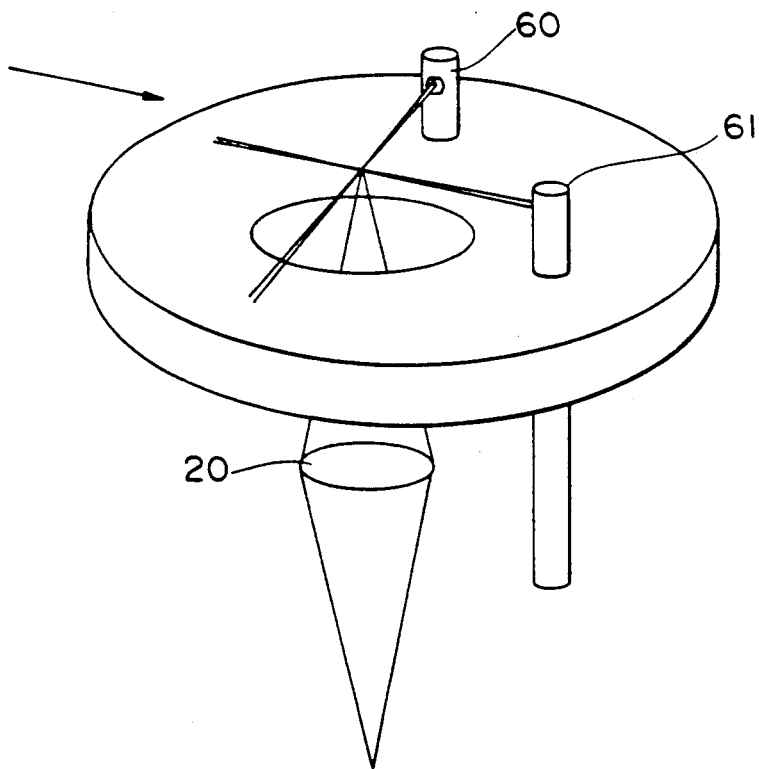
FIG. 2 is a schematic diagram of a miniature dual-probe laser velocimeter for near-wall three-dimensional measurements according to a fourth embodiment of the present invention.

FIG. 2 is a schematic representation of a laser velocimeter system according to a fourth embodiment of the present invention in which a dual-probe laser velocimeter is used for near-wall measurements. Two probes 60 and 62 are used. In this embodiment, all three velocity components can be measured simultaneously rather than two at a time as in the systems shown in FIGS. 1(A)–1(C). That is, in the first through third embodiments of the present invention shown in FIGS. 1(A)–1(C), all of the Reynolds stresses can be measured but three different directions of the beam-turning probe 26 or miniature fiber optic head 50 are required. This could cause a problem if there are changes in the flow, for example, while repositioning the beam-turning probe 26 or miniature fiber optic head 50. Depending on the type of measurements required, however, all three probe positions may not be necessary. There is a trade-off between simultaneously measuring all three velocity components and the difficulty in obtaining a common crossing point of three pair of laser beams.

Figure 3:
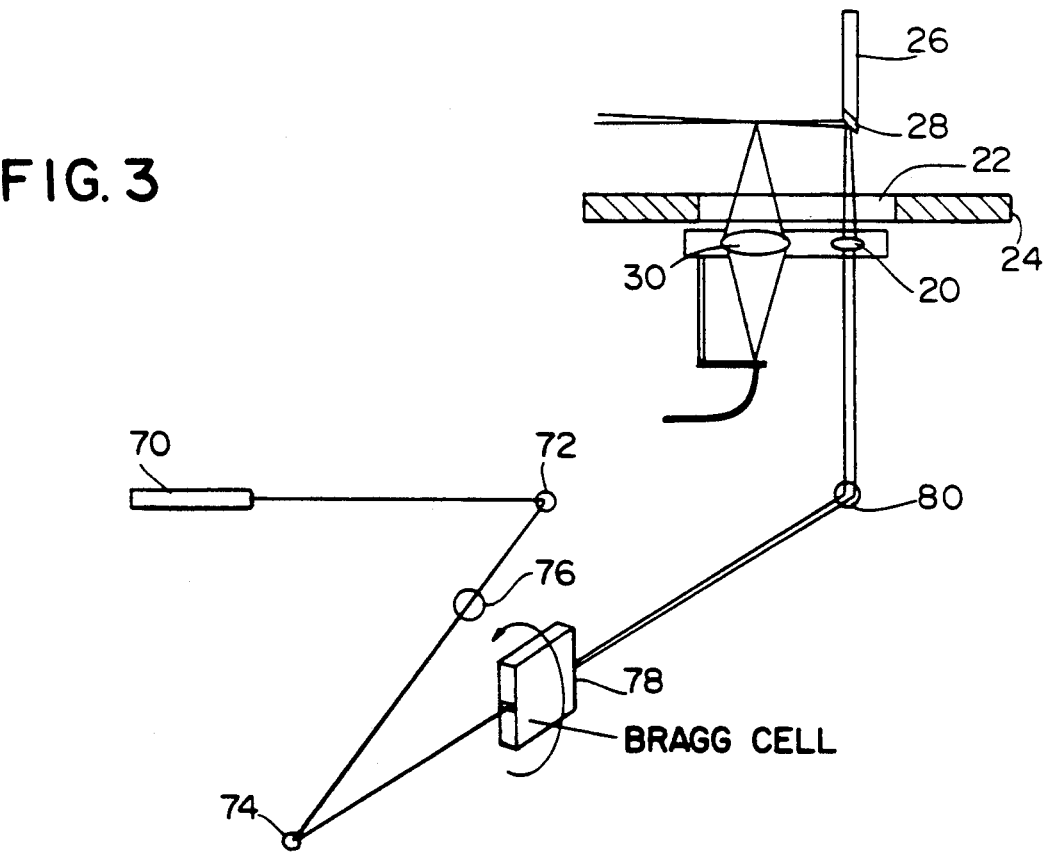
FIG. 3 is a schematic diagram of an optical layout for a two-dimensional turbulent boundary layer measurement system according to the present invention

FIG. 3 is a system adapted to use the laser Doppler velocimeters set forth in FIGS. 1(A)–1(C) and 2. In the system, a laser beam is generate-d from, for example, an Argon laser 70 and is reflected and focused through two reflecting mirrors 72 and 74 and a lens 76. The laser beam is then input to a Bragg cell 78. The Bragg cell 78 is an acousto-optic device which splits the laser beam into two beams and provides a frequency offset between the split laser beams. After the beams are reflected through another mirror 80 and focused by the first lens 20, they will cross after exiting the first lens 20 since they appear to originate from the same point in space. A fiber optic head can be used in the system in FIG. 3.

As set forth above, the present invention features a device which is simple but effective for near-wall measurements of turbulent Reynolds stresses in two and three-dimensional boundary-layer type flows. A beam-turning probe provides the maximum sensitivity possible to the cross stream velocity component w along with the best possible near-wall spatial resolution. In addition, measurements can be made much closer to solid surfaces by allowing much finer focused incident beams to increase resolution and reduce the pickup of background scattered light. To improve the resolution of the cross-flow velocity component, the incident beams are pointed upstream relative to the oncoming flow, giving a direct measurement of this velocity component. This approach is not subject to "virtual particle" measurement errors, with the possible exception of the $-u'w'$.

The present invention is easily adaptable to existing wind tunnels, the system is inexpensive due to the simple lens system employed, and the beam-turning probe does not cause a large amount of interference, especially for near-wall measurements. The present invention also allows near-wall velocity measurements of very thick boundary layers in large wind tunnels or on aircraft. Further, the laser Doppler velocimeter components of the present invention including two lenses and a mirror (or a fiber optic head) can be moved together by the same amount in the same direction using a simple traverse system.

The foregoing is considered as illustrative only of the principles of the present invention. Further, since numerous modifications and changes will readily occur to those skilled in the art, it is not desired to limit the invention to the exact construction and application shown and described, and accordingly, all suitable modifications and equivalents may be resorted to, falling within the scope of the invention and the appended claims and their equivalents.

What is claimed is:

1. A laser Doppler velocimeter for measuring flow velocity near a surface in a wind tunnel comprising:
    means for generating plural laser beams;
    beam-turning means located within the flow of said wind tunnel for receiving and turning said beams approximately 90 degrees and at a grazing incidence relative to said surface;
    means outside said wind tunnel for collecting particle-scattered laser light from the turned laser beams; and
    means coupled to said collecting means for determining at least one velocity component of said near-surface flow.

2. A laser Doppler velocimeter according to claim 1 wherein said generating means includes a laser for producing a light beam, a Bragg cell for splitting the light beam into two beams with a frequency offset between the two beams, and a lens for focusing the two beams at the region of velocity measurement.

3. A laser Doppler velocimeter according to claim 1 wherein said wind tunnel has a free stream flow and that flow reaches said collecting means before it reaches said beam-turning means.

4. A laser Doppler velocimeter as claimed in claim 1 wherein said beam-turning means is a probe with a gooseneck portion that is parallel to said surface.

5. A laser Doppler velocimeter as described in claim 1 wherein said beam-turning means is a probe with an end-mounted reflector for receiving and redirecting said laser beams.

6. A laser Doppler velocimeter according to claim 5 wherein said probe has a bend that is approximately 90 degrees.

7. A laser Doppler velocimeter according to claim 1 wherein said wind tunnel has first and second opposed walls, said first wall has an optical port with at least two opposed sides, said collecting means is positioned on the first side of said optical port and said beam-turning means is positioned on the second side of said optical port.

8. A laser Doppler velocimeter as described in claim 7 wherein said beam-turning means extends from said second wind tunnel wall.

9. A laser Doppler velocimeter as set forth in claim 7 further including means for moving said beam-turning means transversely to said optical port.

10. A laser Doppler velocimeter according to claim 7 further including means for moving said beam collecting means transversely to said optical port.

11. A laser Doppler velocimeter as claimed in claim 7 wherein said laser beams generating means includes a fiber optic head and said fiber optic head is located adjacent to said collecting means and on said first side of said optical port.

12. A laser Doppler velocimeter as set forth in claim 7 wherein said beam-turning means has a fiber optic head including a mirror located therein at an end of said fiber optic head for receiving and redirecting said laser beams.

13. A laser Doppler velocimeter according to claim 12 wherein said fiber optic head further includes a lens that receives said laser beams before they reach said mirror.

14. A laser Doppler velocimeter as described in claim 1 wherein said beam turning means comprises two beam-turning probes.

15. A laser Doppler velocimeter as claimed in claim 14 wherein the beams turned by one of said probes intersect the beams turned by the other probe at an angle of approximately 90 degrees.

* * * * *